July 11, 1933.  C. M. WERT  1,918,200
DUAL RATIO MECHANISM FOR AUTOMOBILES
Filed Feb. 6, 1933  2 Sheets-Sheet 1

Charles M. Wert
INVENTOR

BY Milburn & Milburn
ATTORNEYS

July 11, 1933.   C. M. WERT   1,918,200
DUAL RATIO MECHANISM FOR AUTOMOBILES
Filed Feb. 6, 1933   2 Sheets-Sheet 2

INVENTOR
Charles M. Wert.
BY Milburn and Milburn
ATTORNEYS

Patented July 11, 1933

1,918,200

UNITED STATES PATENT OFFICE

CHARLES M. WERT, OF CLEVELAND, OHIO, ASSIGNOR OF ONE-THIRD TO FRANK F. PETZNICK, OF CLEVELAND HEIGHTS, OHIO, AND ONE-THIRD TO CLARENCE H. DRAY, OF LAKEWOOD, OHIO

DUAL-RATIO MECHANISM FOR AUTOMOBILES

Application filed February 6, 1933. Serial No. 655,457.

This invention relates to a dual-ratio or two-speed transmission mechanism of that type associated with the axle assembly of an automobile.

It is to be understood that with the present invention, there is still employed the conventional transmission for establishing the regular gear ratios as usual, the purpose of this invention being to provide means whereby any given gear ratio thus established can be modified, for instance, by increasing the speed, or whereby the driving force can be transmitted to the driven axles of the automobile wheels without any modification. The present invention contemplates also the possibility of disconnecting the drive shaft from the driven axles of the automobile wheels, independently of the regular clutch and conventional transmission.

The object of my present invention is to devise a simpler, more compact, and extremely durable and dependable two-speed transmission mechanism, in combination with a differential mechanism, said mechanisms being associated together as a unitary form of device.

A more specific object of my invention is to provide a unitary assembly of a differential mechanism and a speed-modifying mechanism comprising internal and external gears with a supporting member rotatably mounted in an enclosing driving casing and affording an internal eccentric bearing for a compound internal-external idler gear which co-operates with a speed-modifying internal gear and a speed-modifying external gear in transmitting different speeds to the differential mechanism, through the manipulation of suitable control means, so as to thereby transmit different speeds to the axle shafts of the automobile wheels.

A further object consists in devising such a mechanism in which there is provided a control means comprising companion clutch members upon the hub portion of the supporting member and also upon the driving casing and upon the stationary axle housing, as a means of obtaining either normal or modified speeds, or for entirely disconnecting the driven axles of the automobile wheels from the drive shaft.

My invention further aims to provide a means whereby the lubricating compound, as it is thrown by centrifugal force from a large ring gear to certain portions of the housing, will be conveyed thence by gravity along a directing channel to a point in the region of the axis of rotation where it is picked up and drawn by centripetal force through a restricted annular throat provided between a suitably formed ring and a correspondingly formed companion part provided upon said casing, and thence through openings in the outer casing.

My invention comprehends also certain designing and refinement of parts that are peculiar to the present combination and are advantageous from the standpoint of simplified manufacture and servicing, all of which will be hereinafter described.

Other objects will appear from the following description and claims when considered together with the accompanying drawings.

It is to be understood also that the present form of disclosure is merely for purposes of illustration and that various other modifications may be effected without departing from the spirit of the present invention as herein set forth and claimed.

Figure 1:
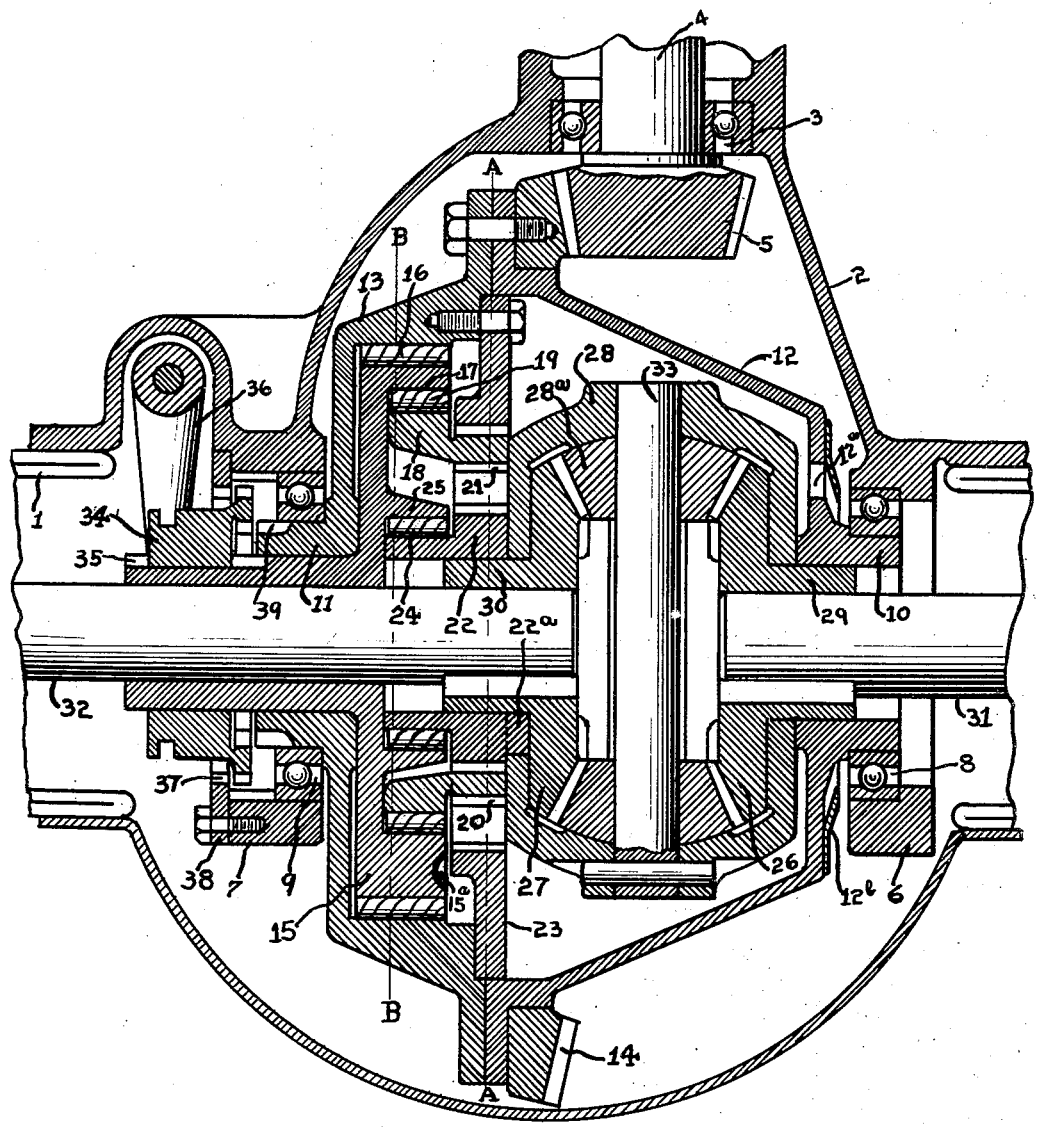
Fig. 1 is a horizontal sectional view of my improved mechanism.

The rear axle housing 1 has a middle portion thereof provided with a detachable plate 2 which has a bearing structure 3 for the support of the drive shaft 4 on which is fixedly mounted a small driving pinion 5. The detachable plate 2 is provided with supports 6 and 7 for the oppositely disposed anti-frictional bearings 8 and 9 which are suitably retained within said supports.

Within the anti-frictional bearings 8 and 9 are journaled the coaxially disposed hubs 10 and 11 of the parts 12 and 13, respectively, which are bolted together so as to form an outer driving casing provided with annularly arranged openings 12$^a$ in one end thereof. Attached to the same end thereof is a centripetal ring 12$^b$ with an inwardly extending cone portion surrounding and spaced from the adjacent portion of hub 10. There is also mounted upon the casing 12 and 13, the large bevel gear 14 meshing with the small bevel driving pinion 5 of the drive shaft 4.

Figure 3:
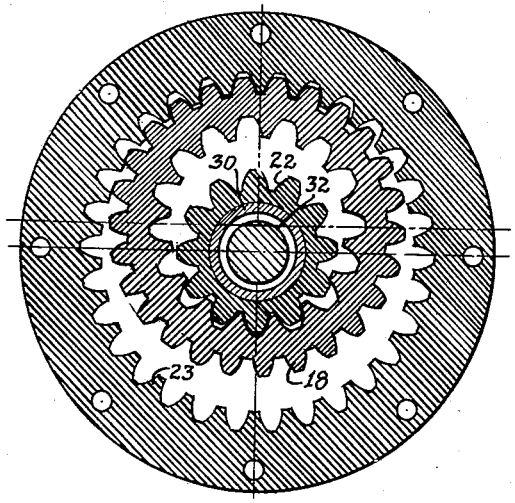
Fig. 3 is a view taken on line A—A of Fig. 1.
Figure 4:
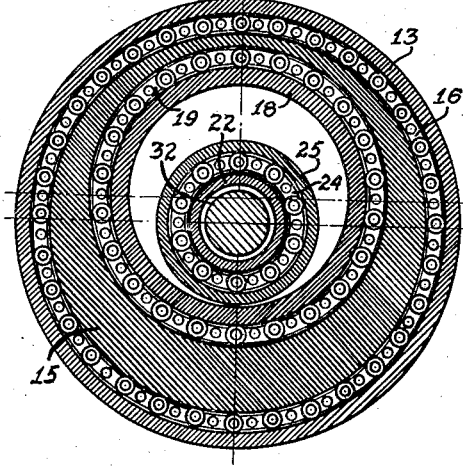
Fig. 4 is a view taken on line B—B of Fig. 1.

Anti-frictional bearing 16 provides a journal for concentrically mounting the supporting member 15 within portion 13 of the outer driving casing, this supporting member having an eccentric bearing wall 17 within which is arranged the anti-frictional bearing 19 providing suitable support for a rotatable combination internal-external idler gear 18 with its tooth portions 20 and 21 in constant mesh with the internal driving gear 23 and external driven gear 22, respectively, as seen in Fig. 3. Internal driving gear 23 is bolted concentrically to the inside of port 13 of the outer driving casing, and the hub portion of external driven gear 22 is concentrically journaled by means of anti-frictional bearing 24 within the hub portion 25 of the supporting member 15.

The differential gears 26 and 27 are journaled within the differential casing 28 by means of their hubs 29 and 30, respectively, which are journaled therewith and coaxially within hub 10 and the hub or bearing portion provided upon the external driven gear 22, respectively. The gears 26 and 27 are splined or keyed to axle shafts 31 and 32, respectively, and mesh with differential pinions 28$^a$ which are rotatably mounted on arm 33, which is rigidly fixed at its ends in suitable, oppositely disposed holes in the wall of casing 28. The differential casing 28 is keyed to portion 22$^a$ of external driven gear 22 so as to rotate therewith.

It will be observed that the supporting member 15 is mounted concentrically for rotation about the axis of the outer driving casing and that the hub of the supporting member 15 extends beyond the hub 11 of the outer driving casing so as to permit the adjustable clutch member to be splined thereupon, as will now be explained.

A toothed clutch member 34 is splined or otherwise slidably keyed to hub portion 35 of supporting member 15 so as to rotate therewith, said clutch member being shiftable back and forth therealong by a conventional yoke form of shifting device 36, the arms of which engage in a groove in the clutch member and which is pivotally mounted at a point in detachable plate 2 for manipulation by the operator through suitable connections.

The clutch member 34, when shifted in one direction, is engageable with the so-called clutch member 37 which forms part of the stationary element 38 in the fixed support 7, and when shifted in the other direction, is engageable with clutch portion 39 which forms part of hub portion 11 of the casing part 13. This clutch mechanism will be more fully understood from the following description of the operation of the entire speed-modifying mechanism.

In the accompanying illustration, the speed-modifying mechanism is in what might be called neutral position; that is, the clutch members 34, 37 and 39 are out of engagement. Therefore, the outer driving casing 12—13 and the large bevel gear 14 may be rotated by the drive pinion 5 without imparting any rotation whatever to the axle shafts 31 and 32.

To obtain the transmission of one speed to the axle shafts 31 and 32, for instance what might be referred to as normal speed, the clutch member 34 is shifted into engagement with clutch member 39, and with these clutch members thus engaged, all mechanism within outer driving casing 12—13 will revolve as a unit with the outer driving casing 12—13 and the large bevel gear 14, thus transmitting to the axle shafts 31 and 32 the unmodified or normal rate of speed of the drive shaft 4 through driving pinion 5 and large bevel gear 14. The rate of speed referred to as "normal" is that speed corresponding to any given ratio in the regular transmission. During this operation, the supporting member 15 and internal-external gear 18 do not rotate within their own bearings but merely revolve as a unit.

In order to transmit to the axle shafts 31 and 32 a rate of speed in excess of that corresponding to the gear ratio in the regular transmission at any given time, the clutch member 34 is shifted into engagement with the stationary portion 37, whereupon the supporting member 15 is held stationary. When the supporting member 15 is thus held stationary and the outer driving casing 12—13 is rotated through its drive connection from drive shaft 4, the internal driving gear 23 is carried in the same direction as the large bevel gear 14, thereby causing rotation of the combination internal-external idler gear 18 which is journaled within an eccentrically formed bearing portion of the supporting member 15. The combination internal-external idler gear 18 being in mesh with external driven gear 22, will cause rotation of the said gear 22 in the same direction at an increased rate of speed; and consequently there will be transmitted a correspondingly increased speed of rotation to axle shafts 31 and 32 through the keyed portion 22ª of external driven gear 22, thence through differential casing 28, arm 33, differential pinions 28ª and differential gears 26 and 27.

The larger part of supporting member 15 is cut away to the necessary extent, as indicated at 15ª, in order to obtain proper balance and thereby avoid any vibrations which might otherwise be caused during operation of the mechanism. Other means might be adopted for this purpose.

The mechanism heretofore described will of course be operatable also in connection with the reverse gear combination of the regular transmission, as will be readily understood.

Figure 2:
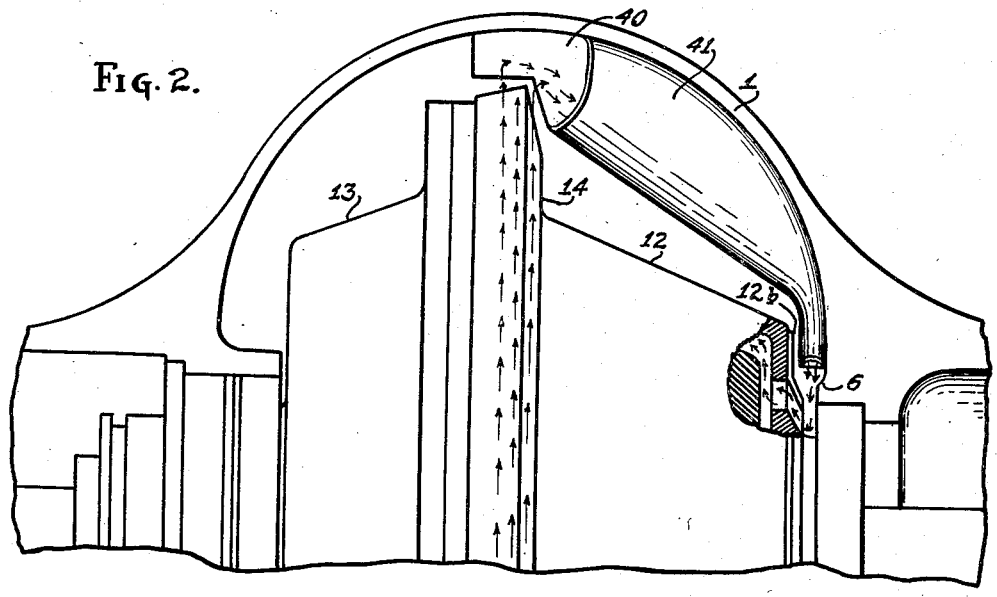
Fig. 2 is a view partly in elevation and partly in section to indicate the manner of distributing the lubricant.

The special lubricating means for this mechanism will now be described. The large bevel gear 14 rotating at any speed, carries with it a portion of the lubricating compound in the axle housing 1 and a part of this lubricant will be thrown by centrifugal force from this gear into the enlarged open end 40 of the inclined and tapered conveying channel 41 which is provided at the top of housing 1. The opening 40 is cut back in an inclined manner upon the near side so as to facilitate the entrance of the lubricant which will be impinged against the inner surface of the far side of the channel member. This lubricant flows by gravity through the channel 41 and out at the smaller end thereof and upon the upper part of support 6, whence it flows onto the hub portion of outer driving casing 12. The lubricant is thence drawn by centripetal force through the passage provided between the tapered portion of hub 10 and the correspondingly shaped centripetal ring 12ᵇ so as to pass through openings 12ª to the inside of outer driving casing 12—13 for lubricating the parts therewithin. The path taken by this lubricant is graphically portrayed by arrow lines in Fig. 2 of the accompanying drawings.

Among the distinguishing characteristics of the present combination, I attach considerable importance to the fact that the supporting member 15 is rotatably mounted concentrically within the outer casing, and affords a concentric bearing surface for rotation of the external driven gear 22, and affords also an eccentric bearing surface within which the combination internal-external idler gear is rotatably mounted. Thus, said combination internal-external idler gear 18 is so located that it will always be in mesh with the internal driving gear 23 and the external driven gear 22. It is the combination of this simple form of mechanism with the differential mechanism that makes possible the present invention with its marked advantages.

Furthermore, from a manufacturing standpoint, the entire unit may be readily assembled or disassembled by virtue of the fact that it is supported upon the detachable plate 2 of the axle housing.

Also, the present combination is comparatively simple and yet extremely dependable and efficient, thus being comparatively inexpensive from the standpoint of manufacture as well as that of wear or replacement of parts.

The particular system of automatic lubrication constitutes another feature of novelty and contributes to the life and efficiency of the mechanism.

Thus, I have accomplished an efficient unitary assembly of mechanism comprising a combination of the differential mechanism and a simplified and efficient speed-modifying means by which the axles may be driven at an increased rate of speed as compared with the normal or unmodified speed. However, it is to be understood that there may be devised other forms of mechanism in which the rate of speed may be modified in such a manner as to operate the axle shafts at a reduced rate of speed as compared with the normal or unmodified speed. Any and all such modifications are to be understood as being comprehended by the following claims.

What I claim is:

1. In a speed-modifying mechanism for an automobile, the combination of a differential mechanism having drive connection with the axles of the automobile wheels, a drive shaft, speed-modifying gears arranged operatively between said drive shaft and differential mechanism, said gears including an internal-external idler gear, and internal and external gears meshing therewith and adapted to effect a modification in speed transmitted to the axles of the automobile wheels, a single supporting member having bearing portions arranged eccentrically and concentrically with respect to the axis of the differential mechanism, for said internal-external idler and external gears, respectively, said external gear being connected with the differential mechanism for operation thereof, said internal gear being connected with the drive shaft, and means whereby said speed-modifying mechanism may be rendered active or inactive so that the automobile wheels may be operated at either normal or modified speed.

2. In a speed-modifying mechanism, an outer driving casing, a drive shaft having suitable connection with said casing for rotating the same, axle shafts of the automobile wheels extending thereinto, said axle shafts operatively connected to a pair of differential gears, a differential casing journaled upon hub portions of said differential gears and located within said outer casing, differential pinions and an arm therefor serving to connect said differential gears to said differential casing, speed-modifying internal and external gears located to one side of said differential casing and within said outer driving casing, one of said speed-modifying internal gears being fixedly connected to said outer driving casing, and one of said speed-modifying external gears being fixedly connected to said differential casing, a single supporting member concentrically journaled within said outer driving casing and having an internal eccentric bearing portion and an internal concentric bearing portion upon one side and an extended hub portion upon the opposite side thereof, an internal-external idler gear journaled within said eccentric bearing portion of said supporting member and being in mesh with both said speed-modifying internal and external gears, said external gear being journaled within said concentric bearing portion of said supporting member, a clutch means adapted to connect said supporting member to said outer driving casing for normal speed, and a stationary part in engagement with which said supporting member may be adjusted by manipulation of said clutch means for the production of increased speed.

3. In a speed-modifying mechanism, an outer driving casing, a drive shaft having suitable connection with said casing for rotating the same, axle shafts of the automobile wheels extending thereinto, said axle shafts operatively connected to a pair of differential gears, a differential casing journaled upon hub portions of said differential gears and located within said outer casing, differential pinions and an arm therefor serving to connect said differential gears to said differential casing, speed-modifying internal and external gears located to one side of said differential casing and within said outer driving casing, one of said speed-modifying internal gears being fixed connected to said outer driving casing, and one of said speed-modifying external gears being fixedly connected to said differential casing, a single supporting member concentrically journaled within said outer driving casing and having an internal eccentric bearing portion and an internal concentric bearing portion upon one side and an extended hub portion upon the opposite side thereof, an internal-external idler gear journaled within said eccentric bearing portion of said supporting member and being in mesh with both said speed-modifying internal and external gears, said external gear being journaled within said concentric bearing portion of said supporting member, a clutch means adapted to connect said supporting member to said outer driving casing for normal speed, and a stationary part in engagement with which said supporting member may be adjusted by manipulation of said clutch means for the production of increased speed, the engageable clutch member of said clutch means being slidably mounted along the axis of said supporting member and adapted for rotation therewith.

4. In a speed-modifying mechanism for an automobile, an outer driving casing, a drive shaft having suitable connection with said casing for rotating the same, axle shafts of the automobile wheels extending thereinto, said axle shafts operatively connected to a pair of differential gears, a differential casing journaled upon hub portions of said differential gears, differential pinions and an arm therefor serving to connect said differential gears to said differential casing, speed-modifying mechanism including internal and external gears, said external gear being fixedly connected to said differential casing, mechanism for establishing operative drive connection between said outer casing and said external driven gear, said mechanism including an internal-external gear meshing with said internal and external gears, and means for rendering said speed-modifying mechanism active or inactive so that the automobile wheels may be operated at either normal or modified speed, a lubricant-containing housing enclosing said outer casing, and lubricant-conducting means located in the upper part of said lubricant-containing housing and adapted to receive lubricant discharged thereinto by centrifugal force of rotation of said outer driving casing and to convey such lubricant by gravity to the region of the axis of said outer casing, whence such lubricant may be supplied to the interior thereof by centripetal force through openings provided in the wall of said outer casing, the hub portion of said outer casing being provided with a substantially cone-shaped portion, and a centripetal ring member arranged with respect to said cone-shaped portion and said openings so as to provide an annular passage for the lubricant through said openings.

5. In a speed-modifying mechanism for an automobile, an outer driving casing, a drive shaft having suitable connection with said casing for rotating the same, axle shafts of the automobile wheels extending thereinto, said axle shafts operatively connected to a pair of differential gears, a differential casing journaled upon hub portions of said differential gears, differential pinions and an arm therefor serving to connect said differential gears to said differential casing, speed-modifying mechanism including internal and external gears, said external gear being fixedly connected to said differential casing, said internal gear being connected with the drive shaft, mechanism for establishing operative drive connection between said outer casing and said external driven gear, said mechanism including an internal-external gear meshing with said internal and external gears, and means for rendering said speed-modifying mechanism active or inactive so that the automobile wheels may be operated at either normal or modified speed, a lubricant-containing housing surrounding said outer driving casing and having a readily detachable wall section supporting the mechanism enclosed within said lubricant-containing housing.

6. In a speed-modifying mechanism for an automobile, the combination of a differtial mechanism having drive connection with the axles of the automobile wheels, a drive shaft, speed-modifying gears arranged operatively between said drive shaft and differential mechanism, said gears including an internal-external idler gear, and internal and external gears meshing therewith and adapted to effect a modification in speed transmitted to the axles of the automobile wheels, a single supporting member having bearing portions arranged eccentrically and concentrically with respect to the axis of the differential mechanism, for said internal-external idler gear and for said external gear, respectively, said external gear being connected with the differential mechanism for operation thereof, and means whereby said speed-modifying mechanism may be rendered active or inactive so that the automobile wheels may be operated at either normal or modified speed, said mechanism being dynamically balanced to offset any and all vibrations which might otherwise result from the eccentrically located portion and the parts associated therewith.

7. In a speed-modifying mechanism for an automobile, an outer driving casing, a drive shaft having suitable connection with said casing for rotating the same, axle shafts of the automobile wheels extending thereinto, said axle shafts operatively connected to a pair of differential gears, a differential casing journaled upon hub portions of said differential gears, differential pinions and an arm therefor serving to connect said differential gears to said differential casing, speed-modifying mechanism including internal and external gears, said external gear being fixedly connected to said differential casing, mechanism for establishing operative drive connection between said outer casing and said external driven gear, said mechanism including an internal-external gear meshing with said internal and external gears, and means for rendering said speed-modifying mechanism active or inactive so that the automobile wheels may be operated at either normal or modified speed.

In witness whereof, I hereby affix my signature.

CHARLES M. WERT.